United States Patent [19]

Sturdy

[11] Patent Number: 4,473,332
[45] Date of Patent: Sep. 25, 1984

[54] ANCHOR DEVICE BOLT
[75] Inventor: Harry D. Sturdy, Wilmington, N.C.
[73] Assignee: Sturdy Truck Equipment, Inc., Wilmington, N.C.
[21] Appl. No.: 331,533
[22] Filed: Dec. 17, 1981
[51] Int. Cl.³ .................................................. F16B 39/00
[52] U.S. Cl. ..................................... 411/166; 248/499; 248/507
[58] Field of Search ................ 248/499, 507; 411/119, 411/166, 378, 395; 403/408

[56] References Cited
U.S. PATENT DOCUMENTS 1,127,596  2/1915  Crabiel ...................... 248/224.2 X
2,655,332 10/1953  Carpenter ............................ 248/73
3,856,265 12/1974  Foster ............................ 248/499 X

FOREIGN PATENT DOCUMENTS 2736131  2/1979  Fed. Rep. of Germany ...... 411/378

Primary Examiner—William H. Schultz
Attorney, Agent, or Firm—Richards, Shefte & Pinckney

[57] ABSTRACT

A bolt for use in anchor devices in which a flat-sided head portion of the bolt is selectively received and held against rotation in a flat-sided opening of the anchor device, with the head portion of the bolt being outwardly flared with respect to the axis of the bolt to cause essentially planar contact between the bolt head portion and the opening, and with the bolt being hollow throughout its longitudinal extent.

6 Claims, 5 Drawing Figures

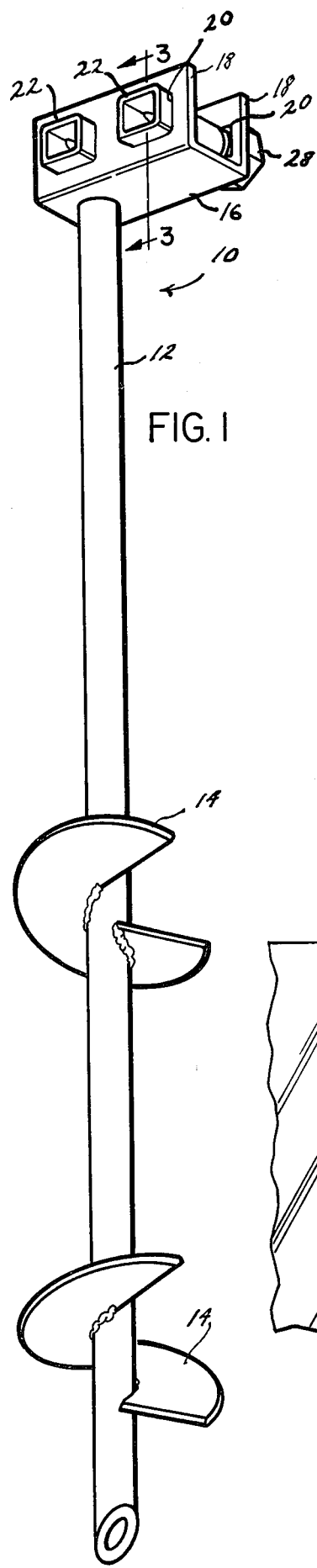
FIG. 1
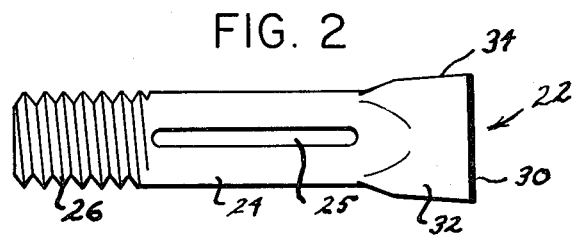
FIG. 2
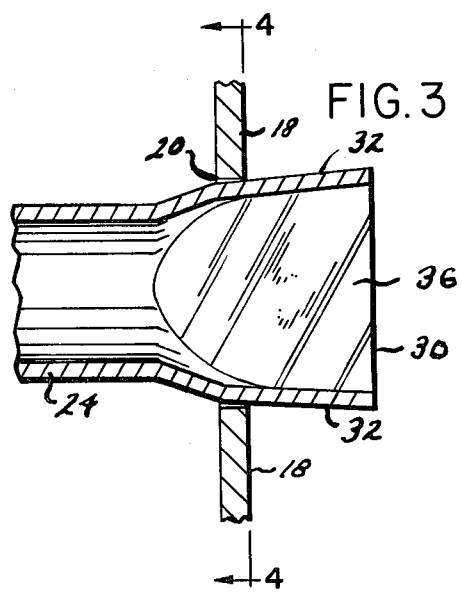
FIG. 3
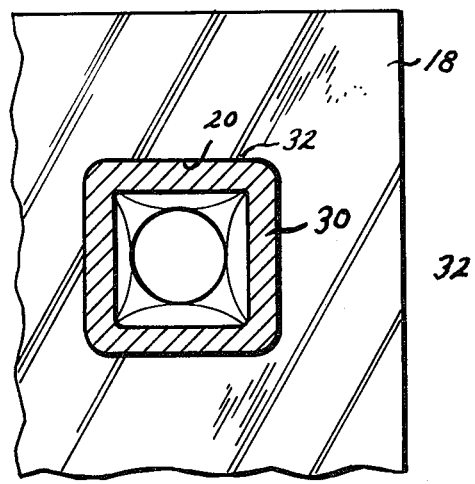
FIG. 4
FIG. 5

4,473,332

1

ANCHOR DEVICE BOLT

BACKGROUND OF THE INVENTION

This invention relates generally to anchor devices designed for use in tying down large objects such as equipment or mobile homes, and, in particular, to a unique bolt for use in such devices. Typical examples of anchor devices of the aforesaid type are disclosed in U.S. Pat. Nos. 3,416,763, 3,638,912, and 3,825,227.

These anchor devices generally include a shank member formed with helical blades or similar holding structures that permit the shank member to be, in effect, either screwed into the ground and held thereat or otherwise secured in place, and the shank member includes a top portion having spaced side walls with aligned openings formed therein to receive one or more rotatable bolts having slots or other means for receiving and holding a strap, wire or the like which is passed over the object to be tied down and attached to the bolt of the anchor device. It is common practice, as shown for example in the aforesaid U.S. Pat. No. 3,416,763, to form at least one of the aforesaid aligned openings with a square or flat-sided configuration, and use a bolt having a head formed with a configuration that corresponds to that of the flat-sided opening so that the bolt can be moved to a first disposition at which the head portion thereof is spaced from the opening to permit rotation of the bolt to tighten the strap, and, when the strap is tightened, so that the bolt can be moved to a second disposition at which the head position thereof is located within the opening to prevent further rotation of the bolt, whereby the strap is maintained in tension across the object being tied down.

In these conventional anchor devices, the head of the bolt has flat sides that extend longitudinally in parallel relation to the axis of the bolt so that the cross-sectional area of the head is constant along such longitudinal extent, and while this construction permits the bolt head to fit into the correspondingly shaped opening at any point along the longitudinal extent of the bolt head, such construction also has certain disadvantages. Because the bolt head passes into and is received within the opening, it must be slightly smaller than the opening to permit the user of the anchor to be able to place the bolt head into the opening with relative ease. This dimensional difference, combined with normal manufacturing tolerances inherent in such devices, necessarily results in a somewhat loose fit between the bolt head and opening when the former is received by the latter, and this loose fit creates a situation in which the bolt head is free to move rotationally to a small degree with respect to the larger opening. When it is recognized that the flat faces of the bolt head intersect one another along an edge that is generally straight or slightly rounded which, in effect, forms a point at each such intersection, it will be appreciated that the aforesaid rotational movement of the bolt head within the opening will create a situation in which the corners of the bolt head come into essentially point contact with the flat sides that form the opening. In applications of anchor bolts to hold down large objects, such as mobile homes, a substantial rotational force is imposed on the bolt when the straps held thereby are in a state of tension, and this force, combined with the aforesaid point contact between the bolt head and the flat sides of the opening, generates substantially stress that can result in premature failure of the anchor. Moreover, this stress will, in time, result in the corners of the bolt head being flattened, whereby the dimensional differences between the bolt head and the openings is further increased.

Additionally, conventional anchor bolts have, heretofore, always been formed of solid metal which makes them somewhat expensive to produce, and which results in relatively high shipping costs because of the weight of the solid bolt. Also, since the head of the bolt is solid, only one size tool or wrench can be used to engage the bolt head for turning the bolt to tension the strap as described above.

In accordance with the present invention, an anchor bolt is provided which overcomes the above-described operational drawbacks of conventional anchor bolts, which reducing the expenses associated with the manufacturing and shipping of such bolts.

SUMMARY OF THE INVENTION

The present invention provides a bolt for use in anchor devices of the type discussed above, such bolt having a stem portion formed to be rotatable within the flat-sided opening formed in the anchor, and having a head portion formed with outwardly flared flat wall portions that all extend longitudinally at a small acute angle with respect to the axis of the bolt. The cross-sectional area of the innermost end of the head portion is less than the area of the opening in which it is received and the cross-sectional area of the outermost or flared end portion of the bolt head is greater than the area of the opening so that the flared wall portion of the bolt head will, at some point along the longitudinal extent thereof, engage the correspondingly shaped opening in essentially linear contact therewith. This linear contact provides essentially flat surface-to-edge engagement that substantially reduces the above-described stress characteristics which are present in conventional anchor bolts.

It has been found that a flare angle of about two degrees between the flat surfaces of the bolt head and the axis of the bolt provides a nice balance between the requirements of providing the required flare while also permitting the bolt head to slide into the opening with relative ease.

In accordance with a further feature of the present invention, the bolt is hollow throughout its entire longitudinal extent, thereby reducing the costs and weight of the bolt while also providing the end face of the bolt head with interior and exterior engagement surfaces, either of which can be engaged by conventional wrench devices for turning the bolt.

BRIEF DESCRIPTION OF THE DRAWINGS

FIG. 1 is a perspective view of an anchor device that includes the anchor bolt of the present invention;

FIG. 2 is a side view of the anchor bolt of the present invention;

FIG. 3 is a sectional view taken along line 3—3 in FIG. 1;

FIG. 4 is a sectional view taken along line 4—4 in FIG. 3; and

FIG. 5 is an end view illustrating the configuration of the head portion of the anchor bolt of the present invention.

DESCRIPTION OF THE PREFERRED EMBODIMENT

An anchor device 10 is illustrated in FIG. 1, and includes a shank element 12 having a plurality of helical, ground engaging plates 14 secured thereto, and a head member 16 that includes opposed, upstanding walls 18 having aligned openings 20 formed therein to receive anchor bolts 22 in a manner to be described presently, at least one of each pair of the aligned openings 20 having a flat-sided (e.g. square) configuration. The shank element 12 and the head member 16 do not, per se, form any part of the present invention, and reference may be made to co-pending U.S. patent application Ser. No. 268,720, filed June 1, 1981, for a more detailed description of the construction and operation of those components.

As best seen in FIGS. 2 and 3, the anchor bolt 22 of the present invention includes a generally round stem portion 24 formed with a strap-receiving slot 25 and having a threaded end 26 which receives a nut 28 (see FIG. 1) in a conventional manner to hold the anchor bolt 22 in place, as will be described below. The anchor bolt 22 also includes a head portion 30 that is formed by a plurality of outwardly flared flat wall portions 32 that intersect one another along rounded edges 34, the number of such wall portions 32 and the general configuration thereof conforming to the number of walls and the general configuration of the opening 20. These wall portions 32 extend generally longitudinally along the bolt 22 and at a small, acute angle with respect to the longitudinal axis of the bolt 22, such angle being preferably about two degrees but shown in slightly exaggerated form in the drawings for clarity of illustration, and the cross-sectional area of the inner end of the head portion 30 is less than the cross-sectional area of the opening 20 in the anchor head member 16 while the cross-sectional area of the outer or extending end of the head portion 30 is greater than the cross-sectional area of the opening 20. Therefore, the peripheral dimensions of the head portion 30, at some point along the longitudinal extent thereof, is substantially identical to the dimensions of the flat-sided opening 20. In the disclosed embodiment of the present invention, the head portion 30 and the opening 20 have a square configuration, but it is to be understood that such configuration is exemplary only and that other flat-sided configurations (e.g. hexagonal) could be used without departing from the present invention.

As best seen in FIGS. 3-5, the anchor bolt 22 is hollow throughout its entire longitudinal extent, thereby reducing the weight and costs of the anchor bolt 22 without significant loss in strength. The hollow configuration of the head portion 30, as best seen in FIG. 5, provides an end face thereof that presents both an interior and an exterior surface that can be engaged by either of two different conventional wrenches for turning the anchor bolt. Thus, by a proper selection of the wall thickness of the head portion 30, the end face thereof could be engaged at the exterior surface thereof by a conventional ¾" crescent wrench, or could be received in the open interior 36 thereof a ½" drive wrench (see FIG. 5).

In use, the anchor device 10 is driven or screwed into the ground or otherwise secured in place in a conventional manner, and the bolts 22, without the nuts 28, are inserted loosely through aligned openings 20 in the head member 16. A strap (not shown), which is anchored at its other end and then passed over the object to be tied down, is inserted in the slots 25 of the bolts 22, and the bolts 22 are turned, usually by a wrench or other conventional tool, so that the strap is wrapped about the stem portion 24 until the strap is tightened and is under tension. During this turning of the bolts 22, they are positioned longitudinally in the aligned openings 20 so that the rounded stem portions 24 are disposed within the opening 20 to permit free turning of the bolts 22. Once the strap is tightened to a desired tension, the bolts 22 are moved longitudinally in the aligned openings 20 until the head portions 30 of the bolts 22 are disposed within one of the openings 20 as illustrated in FIG. 3, and a nut 28 is then threaded onto the end portion 26 of each bolt 22 to hold it at this position.

By virtue of the tapered or flared configuration of the flat wall portions 32 of the bolt head portion 30, it will be apparent that when the bolt 22 is moved longitudinally to be engaged by the square opening 20 as described above, the head portion 30 will, at some point along its longitudinal extent, have an exterior peripheral dimension that is identical to the interior peripheral dimension of the opening 20, and the head portions 30 will therefore seat itself in the opening 20 as shown in FIGS. 3 and 4 with the flat wall portions 32 engaging the walls of the opening 20 in essentially linear contact therewith as best seen in FIG. 4. This full and tight fit between the head portion 30 and the opening 20 results in the turning moment which is imposed on the bolt 22 by the tensioned strap, which can be quite substantial in given applications, being distributed substantially equally about the entire head portion 30 and the walls of the opening 20 so that the above-described point contact and resulting high stress situations encountered in conventional anchor bolts is avoided. It will be noted that the tapered or flared configuration of the bolt head portion 30 readily accommodates the normal tolerances associated with the manufacture of the bolts 22 and the openings 20, and a tight fit between the two will result regardless of such tolerances.

The anchor bolt 22 of the present invention may be used with existing or conventional anchor devices in which the walls of the flat-sided openings 20 are essentially flat or untapered. As illustrated in FIG. 3, the taper or flare of the flat wall portions 32 may result in such wall portions 32 engaging an edge of the walls of the opening 20, but because this engagement occurs along the entire width of the flat-sided walls 32 and the opening walls, such engagement is sufficient to withstand the aforesaid stress imposed or the bolt 22 by the strap. Moreover, it will be appreciated that continuous use of the bolts 22 in the opening 20 will eventually result in some wear at the edges of the walls forming the opening 20 engaged by the bolt head portion 30 so that the walls of the opening 20 will gradually be formed with the same taper of flare as that of the flat wall portions 32 and full planar contact between such wall portions 22 and the walls of the opening 20 will result. If desired, however, the walls of the opening 20 could be formed initially with a tapper or flare corresponding to that of the flat wall portions 32 of the bolt 22.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A bolt and receiving member therefor for use in anchoring devices and the like said receiving member being formed with at least one flat-sided opening having at least four sides for receiving the bolt at a first disposition at which the bolt is rotatable in said opening and a second disposition at which the bolt is locked against rotation in said opening, said bolt comprising a stem portion formed to be rotatable in said opening of a said receiving member, and a head portion formed with at least four outwardly flared flat wall portions extending generally longitudinally of said bolt at an acute angle with respect to the axis thereof, said outwardly flared flat wall portions extending in a plane which intersects the plane of said flat sides of said opening in angular relation thereto so as to engage said flat-sided opening of said receiving member in essentially linear contact therewith at said second disposition of said bolt.

2. A bolt and receiving member as defined in claim 1 and further characterized in that the peripheral dimensions of said flared flat wall portions at some point along said longitudinal extent thereof is substantially identical to the dimensions of said flat-sided opening.

3. A bolt and receiving member as defined in claim 1 further characterized in that said flared flat wall portions extend at an angle of approximately two degrees with respect to said bolt axis.

4. A bolt and receiving member as defined in claim 1 and further characterized in that said stem portion and said head portion of said bolt are hollow throughout their entire longitudinal extent.

5. A bolt and receiving member as defined in claim 1 and further characterized in that said head portion of said bolt is hollow throughout its entire longitudinal extent, and in that the end face of said head portion has predetermined interior and exterior peripheral dimensions selected, respectively, to correspond to the dimensions of two predetermined wrenches whereby such wrenches may be securely received by or engaged by said head portion in abutting relation therewith.

6. A bolt and receiving member therefor for use in anchoring devices and the like said receiving member being formed with a flat sided opening having at least four sides for receiving the bolt at a first disposition at which the bolt is rotatable in said opening and a second disposition at which the bolt is locked against rotation in said opening, said bolt comprising a generally round stem portion that is hollow throughout its entire longitudinal extent, and a head portion joined to said stem portion at one end thereof, said head portion being hollow throughout its entire longitudinal extent and being formed with a plurality of at least four outwardly flared flat wall portions corresponding in number and general shape to the sides of said receiving member opening, said outwardly flared wall portions extending generally longitudinally along said bolt at an acute angle with respect to the axis thereof and in planes which intersect the planes, respectively, of said flat sides of said opening in angular relation thereto for selective engagement with said flat sided opening in linear contact therewith at some point along the longitudinal extent of said flat wall portions, and the end face of said head portion having predetermined interior and exterior dimensions selected, respectively, to correspond to the dimensions of two predetermined wrenches whereby such wrenches may be securely received by or engaged by said head portion in abutting relation therewith.

* * * * *